(12) United States Patent
Fyfe et al.

(10) Patent No.: US 10,939,241 B2
(45) Date of Patent: Mar. 2, 2021

(54) SYSTEMS AND METHODS FOR TIME BASED REMOTE CONTROL OF PRODUCT FUNCTIONALITY

(71) Applicant: 4IIII INNOVATIONS INC., Cochrane (CA)

(72) Inventors: Kipling William Fyfe, Cochrane (CA); Gregory Charles Lund, Calgary (CA)

(73) Assignee: 4IIII INNOVATIONS INC., Cochrane (CA)

( * ) Notice: Subject to any disclaimer, the term of this patent is extended or adjusted under 35 U.S.C. 154(b) by 0 days.

(21) Appl. No.: 16/465,720

(22) PCT Filed: Jul. 27, 2018

(86) PCT No.: PCT/IB2018/000960
§ 371 (c)(1),
(2) Date: May 31, 2019

(87) PCT Pub. No.: WO2019/021060
PCT Pub. Date: Jan. 31, 2019

(65) Prior Publication Data
US 2020/0092679 A1    Mar. 19, 2020

Related U.S. Application Data

(60) Provisional application No. 62/538,559, filed on Jul. 28, 2017.

(51) Int. Cl.
*H04M 3/00* (2006.01)
*H04W 4/029* (2018.01)
(Continued)

(52) U.S. Cl.
CPC ........... *H04W 4/029* (2018.02); *H04W 4/021* (2013.01); *H04W 12/06* (2013.01); *G06F 2221/2137* (2013.01)

(58) Field of Classification Search
CPC ..... H04W 8/245; H04W 8/265; H04W 24/02; H04W 88/02
(Continued)

(56) References Cited

U.S. PATENT DOCUMENTS 10,237,278 B1 * 3/2019 Saylor ................ H04L 63/0884
2003/0033601 A1    2/2003 Sakata et al.
(Continued)

OTHER PUBLICATIONS

In-App Purchase Programming Guide—Working with Subscriptions by Apple Inc. <https://developer.apple.com/library/archive/documentation/Networkinginternet/Conceptual/StoreKitGuide/Chapters/Subscriptions.html> Jul. 13, 2017 (Jul. 13, 2017) Publication date established using Revision History <https://developer.apple.com/library/archive/documentation/Networkinginternet/Conceptual/StoreKitGuide/RevisionHistory.html//apple_ref/doc/uid/TP40008267-CH99-SW1>).

(Continued)

*Primary Examiner* — Temica M Beamer
(74) *Attorney, Agent, or Firm* — Lathrop GPM LLP

(57) ABSTRACT

Systems and methods provide remote control of product functionality and software kits allow firmware development of remote control of product functionality. The remote control may be time-based where the product functionality is based upon the expiration date and a current time. The remote control may be location-based where the product functionality is based upon the geographical location of the product. The remote control of the product functionality may be based upon proximity of the product to an authentication device.

12 Claims, 8 Drawing Sheets

(51) Int. Cl.
    *H04W 4/021*     (2018.01)
    *H04W 12/06*     (2021.01)
(58) Field of Classification Search
    USPC .......................................... 455/418, 419, 420
    See application file for complete search history.

(56)                    References Cited

U.S. PATENT DOCUMENTS

2011/0167008  A1      7/2011   King
2013/0254903  A1*     9/2013   Araki ...................... G06F 21/44
                                                                    726/29
2015/0373536  A1*    12/2015   Sprigg .................. H04L 69/329
                                                                   709/217
2016/0134694  A1*     5/2016   Berdichevsky ..... H04L 67/1095
                                                                   709/219

OTHER PUBLICATIONS

Bernadette Johnson "How the Internet of Things Works" Aug. 19, 2015 (Aug. 19, 2015). Accessed by HowStuffWorks.com.: <https://computer.howstuffworks.com/internet-of-things.htm> on Jan. 9, 2019 (Jan. 9, 2019).
International Search Report and Written Opinion of PCT/IB2018/000960 dated Jan. 11, 2019, 6 pp.
European Patent Application No. 18838903.5, Extended Search Report dated Mar. 20, 2020, 10 pages.

* cited by examiner

SYSTEMS AND METHODS FOR TIME BASED REMOTE CONTROL OF PRODUCT FUNCTIONALITY

CROSS-REFERENCE TO RELATED APPLICATION

This application claims the benefit of priority from U.S. Provisional Application No. 62/538,559, filed Jul. 28, 2017, the entire content of which is hereby incorporated by reference into this application.

BACKGROUND

A manufacturer of a product often makes more than one version of that product to suit different market areas. However, these different product versions are often very similar, if not identical, in hardware configuration, such that only firmware differs between versions.

DETAILED DESCRIPTION OF THE EMBODIMENTS

A product (e.g., a commercially sold device, apparatus, internet of things "IoT" device) may include many features. However, due to market demand, a company manufacturing or supplying the product may wish to sell several versions, ranging from a low-end version that has only a few features to a high end version that has many features. When the hardware for the low-end and high-end versions is the same (or nearly the same), it is only the firmware (e.g., software) that marks the major difference between these versions. However, a consumer of the low end version cannot easily upgrade to the high end version without replacing the firmware or by purchasing the high end version.

Since hardware of the low end and high end versions of the product is substantially identical, cost of manufacturing the hardware is also the same; however tracking different firmware within the two products increases complexity of manufacture and marketing as compared to a single product. It is therefore advantageous to manufacture and sell a single product where functionality of that product is remotely controlled from a server that tracks entitlement of the functionality, for example based upon payment.

By configuring a single product with firmware that includes time-based remote control of functionality, the functionality of the product is controllable by the manufacturer or seller allowing a customer to initially purchase a low-end, lower cost product with basic features, and then add features at a later time by purchasing them through the manufacturer or seller who then remotely enables the additional features. For example, certain features within the product may be related to a subscription based functionality within a cloud server, where the product feature (such as additional data collections and transfer) is activated when the subscription and cloud server functionality is activated, based upon a payment.

Figure 1:
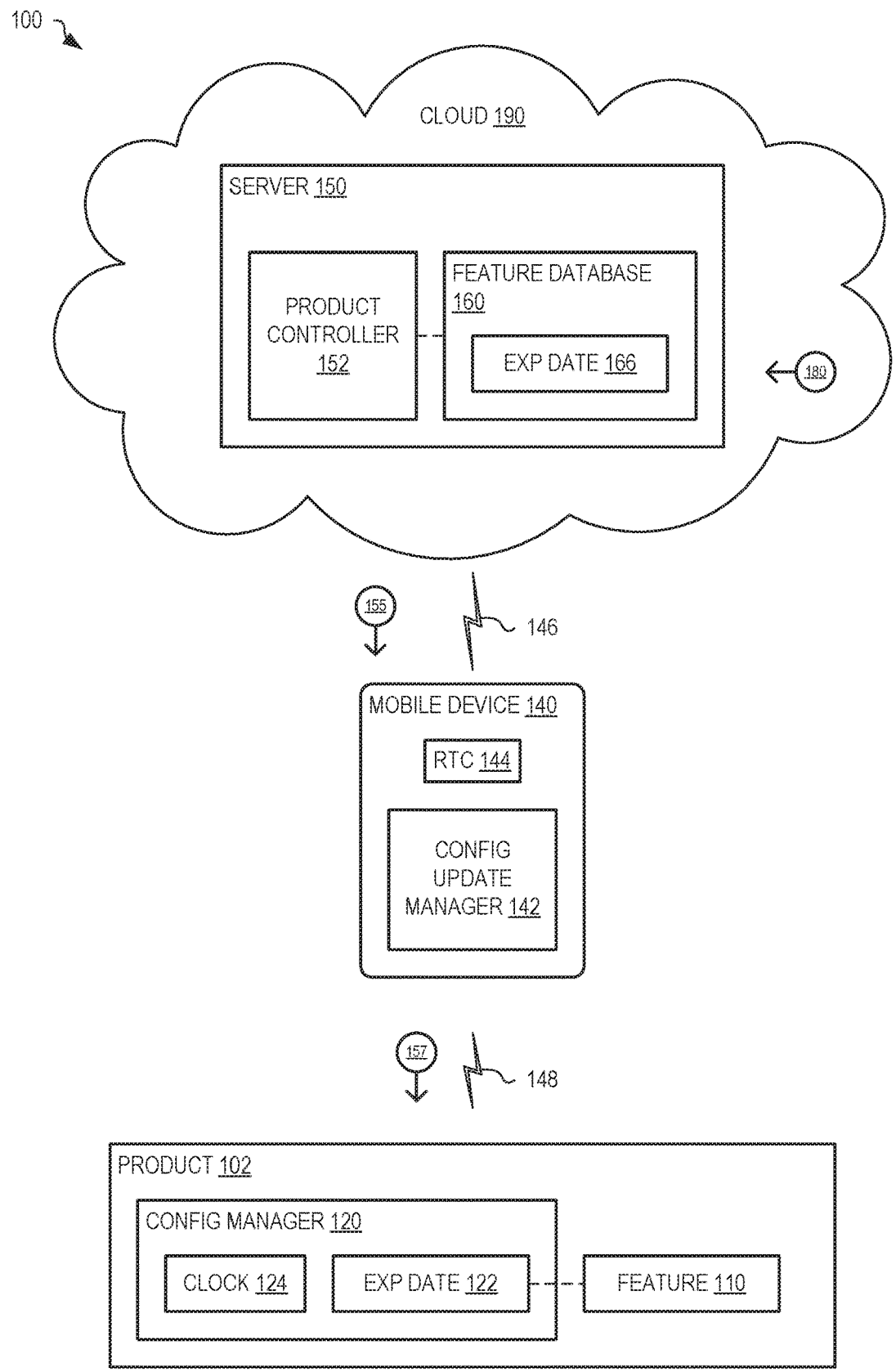
FIG. 1 shows one example system for time based remote control of product functionality, in an embodiment.

FIG. 1 shows one example system 100 for time based remote control of product functionality A product 102 has at least one feature 110 implemented as firmware and/or hardware that provides at least part of the functionality of product 102. Product 102 is for example a device or apparatus configured to measure one or more sports metrics (e.g., heartrate, cadence or power) where feature 110 corresponds to one of those metrics. Feature 110 has a corresponding expiration date 122 that defines a date and/or time after which feature 110 is to be disabled. A configuration manager 120 of product 102 periodically and/or aperiodically compares expiration date 122 to a clock 124 (e.g., a real-time clock that maintains a current time and date), and if clock 124 is later (e.g., greater than) expiration date 122, then configuration manager 120 clears (e.g., sets to zero value) expiration date 122 to indicate that corresponding feature 110 is disabled. That is, when expiration date 122 of feature 110 is clear, functionality of feature 110 is disabled. Feature 110 may include firmware and/or hardware that evaluates expiration date 122 and only operates when expiration date 122 is not clear (zero). In certain embodiments, feature 110 evaluates expiration date 122 and has a first functionality when expiration date 122 is not clear and a second functionality when expiration date 122 is clear. For example, expiration date 122 may control a level of functionality of feature 110.

In the example of FIG. 1, product 102 includes low-powered wireless communication capability 148 (e.g., Bluetooth, etc.) and communicates with a mobile device 140. Mobile device 140 is a computer that includes a processor, memory, and wireless communication capability 146, 148. Mobile device 140 is for example a smartphone, a tablet computer, a laptop computer, a bike computer, and other similar devices, products, and/or apparatus that has connectivity with the Internet. In certain embodiments, mobile device 140 and product 102 are paired to one another, where mobile device 140 operates as an interface of product 102.

Configuration manager 120 may periodically and/or aperiodically communicate with mobile device 140 (and/or other devices) to request a current time and date. For example, configuration manager 120 may communicate with mobile device 140 to retrieve a value indicative of a current time and date from a real-time clock 144 of mobile device 140 and use that value to update clock 124 within product 102. Configuration manager 120, when connected to an appropriate network, may alternatively determine a current time and date from other sources without departing from the scope hereof; for example, when configured to connect directly with the Internet, configuration manager 120 may determine a current time and date directly from an Internet source. Product 102 may include hardware and/or firmware that keep clock 124 current in real-time independently of mobile device 140 (e.g., utilizing real-time clock hardware and/or a timer running within firmware) while power is available to product 102. Thus, feature 110 may be disabled even when product 102 is not in communication with mobile device 140.

A server 150, for example located within "the cloud" 190 and accessible via the Internet, includes a product controller 152 and a feature database 160. Feature database 160 includes an expiration date 166 corresponding to feature 110 of product 102. In response to a control token 180 (see also FIG. 2), product controller 152 updates expiration date 166 for feature 110 of product 102, as identified within control token 180. For example, a user may pay for a feature to be enabled for one year on product 102, wherein control token 180 is received by product controller 152, which in turn updates expiration date 166 to have a time and date one year into the future from a current time and date.

Mobile device 140 includes a configuration update manager 142 that communicates (wirelessly and/or wired) with server 150 via cloud 190 to retrieve expiration date 166. For example, configuration update manager 142 has machine readable instructions stored in the memory and executed by the processor of mobile device 140 to retrieve expiration date 166 from database 160 as a feature update message 155. In one embodiment, configuration update manager 142 retrieves, using its wireless communication capability 146, feature update message 155 (containing expiration date 166) from server 150 whenever product 102 communicates with mobile device 140. In another embodiment, configuration update manager 142 periodically (e.g., daily) retrieves expiration date 166, as feature update message 155, from server 150 via wireless communication capability 146. In yet another embodiment, configuration update manager 142 receives, via communication capability 146, feature update message 155 from product controller 152 of server 150; then, when in communication with product 102, configuration update manager 142 sends configuration update message 157 to product 102 via low-powered wireless communication capability 148.

Configuration update manager 142 sends feature update message 157, including expiration date 166, to configuration manager 120 of product 102, where it is stored in memory as expiration date 122 to control operability of feature 110. In one example of operation, as the user pays for functionality corresponding to feature 110 of product 102, expiration date 166 within feature database 160 is updated, and expiration date 166 is communicated via mobile device 140 as feature update message 155 to configuration manager 120 of product 102 where it is stored as expiration date 122 to control (e.g., enable or disable) operability of feature 110. Under control of configuration manager 120, operability of feature 110 is based upon expiration date 122 and clock 124.

Figure 2:
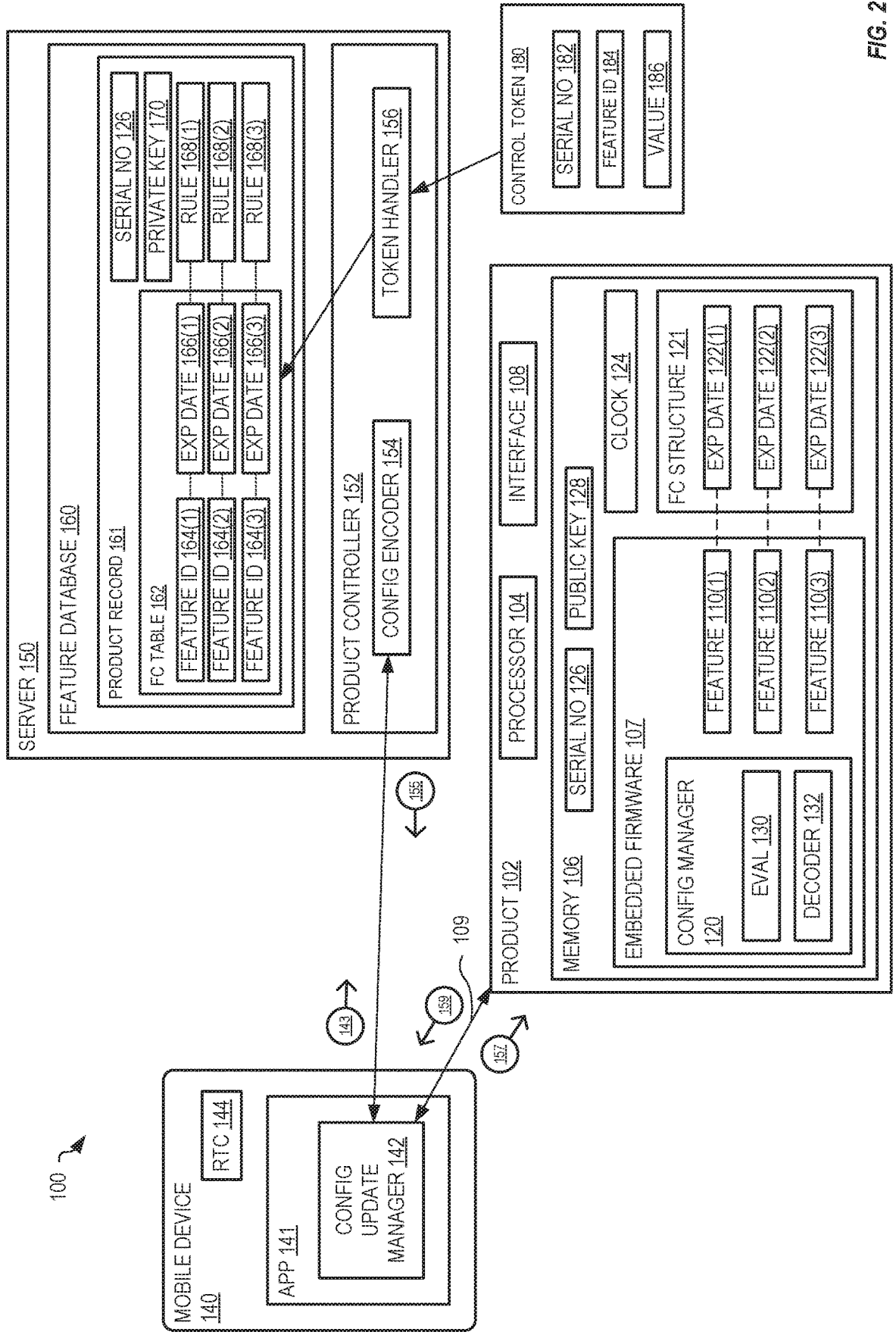
FIG. 2 shows the system of FIG. 1 in further example detail and illustrating three product features remotely controlled from a server.

FIG. 2 shows system 100 of FIG. 1 in further example detail, illustrating three features 110(1)-(3) of product 102 that are remotely controlled from server 150. In one example of operation, product 102 is a power meter for measuring power applied to a bicycle crank arm. A first feature 110(1) of product 102 determines an average of power applied to the crank arm for each revolution of the crank arm. A second feature 110(2) of product 102 measures a profile of the power applied to the crank arm through one revolution. A third feature 110(3) of product 102 measures temperature. In this example, feature 110(1) is enabled at a base level (e.g., cheaper) product, features 110(1), 110(2) are both enabled for a medium-level product, and features 110(1), 110(2), 110(3) are all enabled for a top level (e.g., most expensive) product. However, rather that provide three different hardware configurations to the market, all features 110(1), 110(2), 110(3) are available as hardware within product 102, but operation of each feature 110(1), 110(2), 110(3) is separately controlled remotely from server 150. For example, server 150 may receive control token 180 to activate one or more features 110(1), 110(2), 110(3) of product 102 based upon receipt of one or more payments by a seller of product 102.

In the embodiment of FIG. 2, product 102 includes a processor 104, memory 106, and an interface 108. Interface 108 is for example a transceiver capable of short-range wireless communication 109 (e.g., Bluetooth) with mobile device 140. Product 102 has a serial number 126, stored within memory 106, which uniquely identifies product 102 within server 150. Memory 106 also stores embedded firmware 107 that has machine readable instructions that are executed by processor 104 to implement features 110(1), 110(2), 110(3) of product 102. Embedded firmware 107 also includes configuration manger 120 that implements remote control of features 110(1), 110(2), 110(3) from server 150, as described in detail below.

In one embodiment, upon activation of product 102, configuration manager 120 sends a request message 159 containing serial number 126 to mobile device 140 to request a configuration update. For example, when product 102 is turned on, configuration manager 120 may establish communication with mobile device 140, via interface 108, and send request message 159 to configuration update manager 142 of app 141. In response, configuration update manager 142 may send a configuration update request 143, including serial number 126, to server 150. In response, product controller 152 of server 150 generates feature update message 155 based upon serial number 126, and then sends feature update message 155 to mobile device 140. In turn, configuration update manager 142 of app 141 sends feature update message 157 containing a current date and time from RTC 144 and information received in feature update message 155, to product 102 as feature update message 157. Configuration manager 120 may then update clock 124 based upon the date and time within feature update message 157, and then update feature control structure 121 based upon feature control table 152 within feature update message 157.

A feature database 160 of server 150 is shown storing serial number 126 of product 102, and for each controllable feature 110(1), 110(2), 110(3), a feature ID 164(1), 164(2), 164(3), expiration date 166(1), 166(2), 166(3), and an update rule 168(1), 168(2) 168(3). As shown in the example of FIG. 2, for product 102 that is identified by serial number 126, a plurality of feature IDs 164(1), 164(2), 164(3) and corresponding expiration dates 166(1), 166(2), 166(3) are collectively grouped as a feature control table 162. That is, feature control table 162 groups expiration dates 166(1), 166(2), 166(3) that control operability of features 110(1), 110(2), 110(3) of product 102. Product controller 150 includes a token handler 156 for receiving and handling control token 180 and a configuration encoder 154 for sending updated expiration dates 166(1), 166(2), 166(3) to product 102. Feature IDs 164(1), 164(2), 164(3) are optional and may be a name and/or a number that identifies a specific feature 110(1), 110(2), 110(3) of product 102, and may be used when processing control token 180, as described in further detail below. Update rules 168(1), 168(2), 168(3) are similarly optional and may define how token handler 156 processes the received control token 180 and updates expiration dates 166(1), 166(2), 166(3) corresponding to feature IDs 164(1), 164(2), 164(3). For example, update rule 168(3)

may define that all of expiration dates 168(1), 169(2), 168(3) are updated when feature 110(3) corresponding to feature ID 164(3) is enabled. In another example, update rule 168(2) may indicate that expiration date 166(2) is updated to enable feature 110(2) and that expiration date 166(1) is cleared to disable feature 110(1).

Control token 180 includes a serial number 182, at least one feature ID 184, and at least one corresponding value 186. Token handler 156 matches serial number 182 to serial number 126 within feature database 160 to determine which product 102 control token 180 is to be applied to. Token handler 156 matches feature ID 184 to one of feature IDs 164 corresponding to product 102. In certain embodiments, feature ID 184 is a number that corresponds to a position of expiration dates 122(1), 122(2), 122(3) within a feature control structure 121 (described below) of product 102 and/or an order of expiration dates 166(1), 166(2), 166(3) within feature database 160. For example, where feature ID 184 has a value of two, control token 180 relates to feature 110(2) within product 102. In one embodiment, value 186 indicates an expiration date to be applied to the identified feature(s). In another embodiment, value 186 indicates a duration (e.g., days) that the feature identified by feature ID 184 should be enabled for. In another embodiment, value 186 is a value of a payment made for the identified feature. Accordingly, expiration date 186(1), 186(2), 186(3) corresponding to the feature identified by feature ID 184 for the product 102 identified by serial number 182 is updated based upon value 186. Control token 180 may contain other information without departing from the scope hereof.

Though FIG. 2 shows three features 110(1), 110(2), 110(3) enabled via feature IDs 164(1), 164(2), 164(3), expiration dates 166(1), 166(2), 166(3), and rules 168(1), 168(2), 168(3), respectively, more or fewer numbers of features 110, expiration dates 166, and rules 168 may be included without departing from the scope hereof.

In one embodiment, after updating feature database 160, token handler 156 invokes configuration encoder 154 to generate feature update message 155 containing information from feature control table 162 of product 102. Configuration encoder 154 then sends feature update message 155 to product 102 via mobile device 140. For example, feature database 160 may store contact information (e.g., phone number, email address, MAC address) of mobile device 140 and/or configuration update manager 142. In certain embodiments, feature update message 155 is a notification type message. In one embodiment, configuration update manager 142 is part of an app 141 running on mobile device 140. For example, where product 102 measures cycling metrics, mobile device 140 is paired with product 102 such that app 141 receives the measured metrics from product 102. For example, app 141 may be provided by the manufacturer or seller of product 102. In one embodiment, where mobile device 140 and app 141 are not currently communicating with product 102, configuration update manager 142 may store feature update message 155 within mobile device 140. In another embodiment, where mobile device 140 and app 141 are not currently communicating with product 102, configuration update manager 142 discards feature update message 155 since configuration update manager 142 will request a feature update from product controller 152 when communication is next established with product 102.

Figure 3:
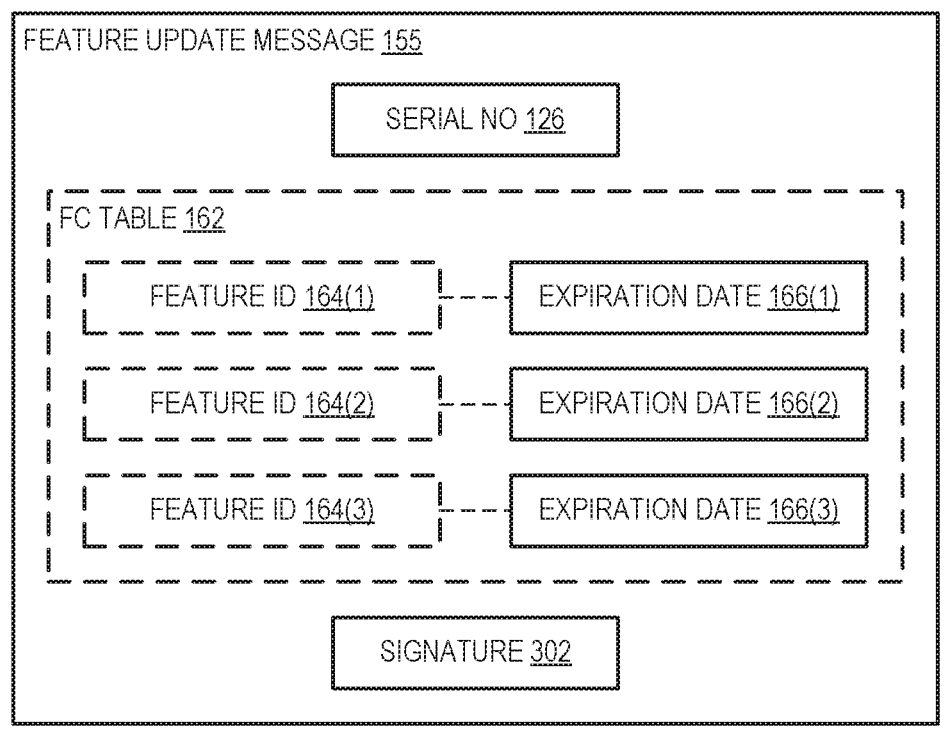
FIG. 3 shows further example detail of the feature update message of FIG. 2, in an embodiment.

FIG. 3 shows further example detail of feature update message 155 of FIG. 2. FIGS. 2 and 3 are best viewed together with the following description. Upon receipt of a feature update request 143 from configuration update manager 142 of mobile device 140, product controller 152 invokes configuration encoder 154 to generate and send feature update message 155 to mobile device 140. In another embodiment, as described above, configuration encoder 154 is invoked by token handler 156 to generate and send feature update message 155 when one or more expiration dates 166 are changed for product 102.

Configuration encoder 154 retrieves information corresponding to product 102 from database 160 and generates feature update message 155 to include serial number 126 and feature control table 162. As shown in the example of FIG. 3, feature update message 155 may also include a feature identifier 164 for each expiration date 166. In an alternate embodiment, where feature identifiers 164 are omitted, features 110 are identified based upon the order of expiration dates 166 within feature update message 155. Configuration encoder 154 may use a private key 170 to generate a signature 302 (e.g., a cipher, a CMAC, a TwoFish generated cipher, etc.) based upon serial number 126, feature identifiers 164 (if included), and expiration dates 166, and includes signature 302 within feature update message 155. Thus, signature 302 may be used to determine validity and authenticity of feature update message 155.

Upon receiving configuration update message 155 within mobile device 140, configuration update manager 142 forwards information of configuration update message 155 to product 102 as configuration update message 157 using short-range wireless communication 109 (e.g., Bluetooth). In certain embodiments, configuration update manager 142 may store information of configuration update message 155 until app 141 is in communication with embedded firmware 107 of product 102, or until communication to product 102 is available to receive feature update message 157.

Upon receiving feature update message 157, configuration manager 120 utilizes a decoder 132 to validate and authenticate feature update message 157 based upon signature 302 and public key 128. If feature update message 157 is authentic and valid, configuration manager 120 updates feature control structure 121 from feature control table 162 within feature update message 157. For example, configuration manager 120 copies expiration dates 166 from feature control table 162 within feature update message 157 to corresponding expiration dates 122 of feature control structure 121. In the example of FIGS. 2 and 3, configuration manager 120 copies expiration date 166(1) to expiration date 122(1), expiration date 166(2) to expiration date 122(2), and expiration date 166(3) to expiration date 122(3).

Functionality of each feature 110 is controlled by a corresponding expiration date 122 within feature control structure 121. Firmware of each feature 110 evaluates the corresponding expiration date 122 and may control operability of the feature based upon whether the expiration date is zero.

Configuration manager 120 periodically and/or aperiodically invokes an evaluator 130 to process feature control structure 121 to clear expiration dates 122 that have expired. For example, evaluator 130 compares each expiration date 122 within feature control structure 121 to clock 124 and if expiration date 122 is before (e.g., has a value less than) clock 124, evaluator 130 clears expiration date 122, thereby controlling operability of the corresponding feature 110. Clock 124 is automatically updated within product 102, either by (a) hardware (e.g., a real-time clock implementation), (b) firmware (e.g., a timer running within processor 104), and/or (c) fetching a current time from mobile device 140 (or from other sources of time). Thus, features 110 of product 102 may be controlled (i.e., disabled), even when product 102 is not in communication with mobile product 102, based upon clock 124. Further, since evaluator 130 clears expiration date 122 when expired, product 102 cannot be "tricked" into re-enabling an expired feature by resetting clock 124 to an earlier date/time (e.g., by manipulating real-time clock 144 of mobile device 140 for example).

Figure 4:
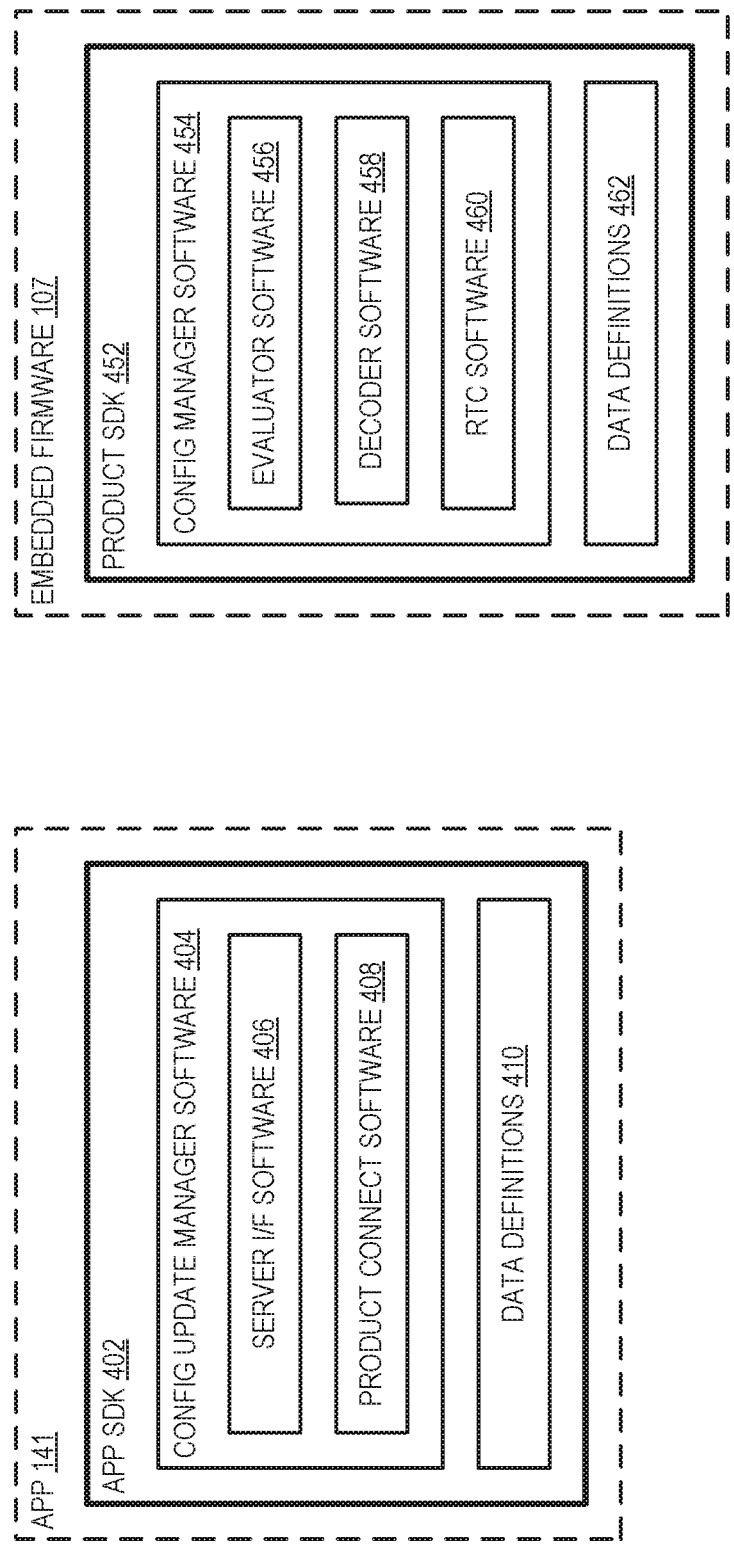
FIG. 4 shows an app software development kit (SDK) that facilitates interfacing the app of FIGS. 1 and 2 with the server and a product SDK that facilitates implementation of remote controlled functionality within the product, in an embodiment.

FIG. 4 shows an app software development kit (SDK) 402 that facilitates interfacing app 141 with server 150 and product 102, and a product SDK 452 that facilitates implementation of remote controlled functionality within product 102 and communication with mobile device 140. App SDK 402 and product SDK 452 are matched to facilitate development of app 141 and embedded software 107, respectively, to implement remote control of features 110 within product 102 from server 150.

App SDK 402 includes computer update manager software 404 and data definitions 410. Computer update manager software 404 has machine readable instructions that when executed by a processor (e.g., a processor of mobile device 140) allow an app (e.g., app 141) to communicate with server 150 and to cooperate with embedded firmware (e.g., embedded firmware 107) of a product (e.g., product 102) to remotely control features (e.g., features 110) thereof. Data definitions 410 define data structures that facilitate building of app 141 to include functionality of configuration update manager 404. In one embodiment, computer update manager software 404 includes server interface software 406 that allows app 141 to connect and communicate with server 150. Computer update manager software 404 may also include product connect software 408 that allows app 141 to communicate with configuration manager 120 running on product 102.

Product SDK 452 includes a configuration manager software 454 that has machine readable instructions that, when built into embedded software 107 and executed by processor 104, implement functionality of configuration manager 120 within product 102 to control of each feature 110 based upon feature control structure 121. For example, configuration manager software 454 includes evaluator software 456, decoder software 458, and real-time clock software 460 as machine readable instructions that implement functionality of evaluator 130, decoder 132, and clock 124, respectively, as described above. Product SDK 452 also includes data definitions 462 that define feature control structure 121 and support building of embedded firmware 107 to include configuration manager 120 and control of each feature 110.

Figure 5:
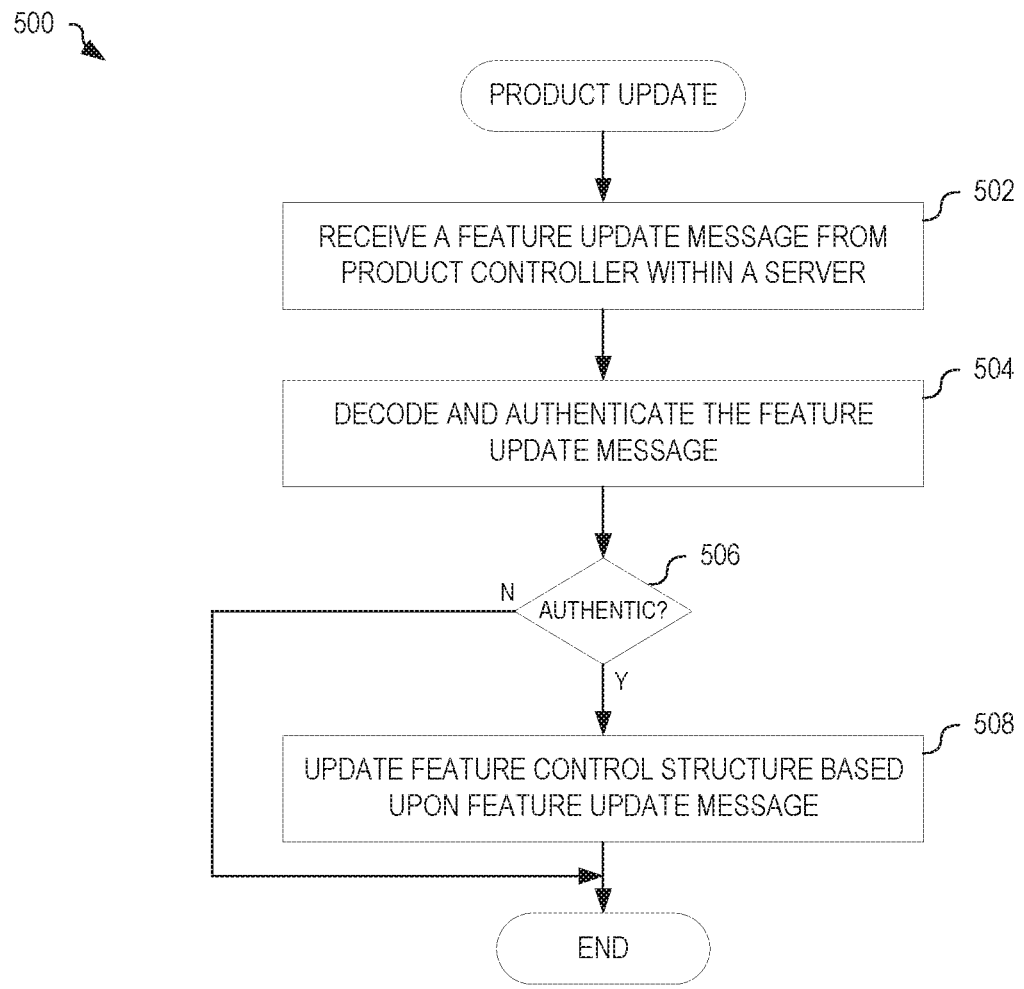
FIG. 5 is a flowchart illustrating one example method for time based remote control of product functionality using a feature update message, in an embodiment.

FIG. 5 is a flowchart illustrating one example method 500 for time based remote control of product functionality using a feature update message. Method 500 is for example implemented within embedded firmware of product 102.

In step 502, method 500 receives a feature update message from a product controller of a server. In one example of step 502, configuration manager 120 received feature update message 157 from configuration update manager 142 in response to configuration update manage 142 receiving feature update message 155 from product controller 152 of server 150.

In step 504, method 500 decodes and authenticates the feature update message. In one example of step 504, configuration manager 120 invokes decoder 132 to validate and authentication signature 302 of feature update message 157 using public key 128 and serial number 126 stored within memory 106.

Step 506 is a decision. If, in step 506, method 500 determines that the feature update message is valid and authentic, method 500 continues with step 508; otherwise, method 500 terminates.

In step 508, method 500 updates the feature control structure based upon the feature update message. In one example of step 508, configuration manager 120 updates feature control structure 121 based upon feature control table 162 within feature update message 157. Method 500 then terminates. Within product 102, method 500 thereby implements time-based remote control of functionality.

Figure 6:
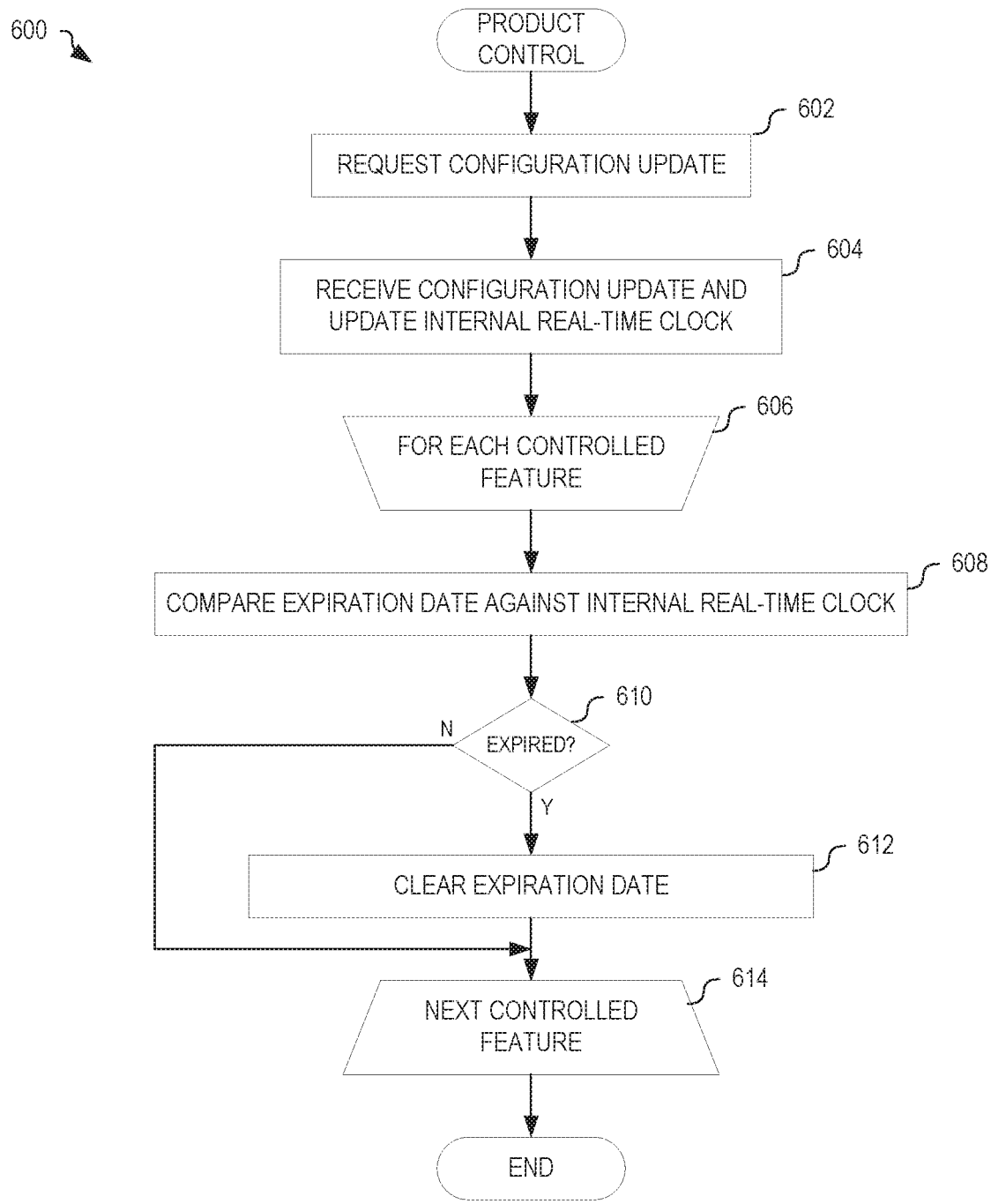
FIG. 6 is a flowchart illustrating one example method for time based remote control of product functionality using an internal real-time clock, in an embodiment.

FIG. 6 is a flowchart illustrating one example method 600 for time based remote control of product functionality using an internal real-time clock. Method 600 is for example implemented within embedded firmware of product 102.

In step 602, method 600 requests a configuration update. In one example of step 602, configuration manager 120 sends update request message 159, via interface 108, to app 141 running on mobile device 140. In step 604, method 600 receives a configuration update and updates an internal real-time clock. In one example of step 604, configuration manager 120 receives feature update message 157 from configuration update manager 142 of app 141 running on mobile device 140 and sets clock 124 to a value.

Steps 606 through 614 for a loop that repeat for each remotely controlled feature of product 102. In the example of FIG. 2, steps 606-614 iterate through feature 110(1)-(3). In step 608, method 600 compares the expiration date of the current feature against the internal real-time clock. In one example of step 608, evaluator 130 compares expiration date 122(1) to a current value of clock 124.

Step 610 is a decision. If, in step 610, method 600 determines from step 608 that the expiration date has expired, method 600 continues with step 612; otherwise, method 600 continues with step 614. In step 612, method 600 clears the expiration date. In one example of step 612, evaluator 130 clears expiration date 122(1).

In step 614, method 600 returns to repeat steps 606 through 612 for other features 110 of product 102. Once all features are processed, method 600 terminates.

Methods 500 and 600 may be combined within embedded firmware 107 of product 102 such that product 102 receives control of features from remote server 150 and automatically deactivates those features based upon an internal real-time clock.

Figure 7:
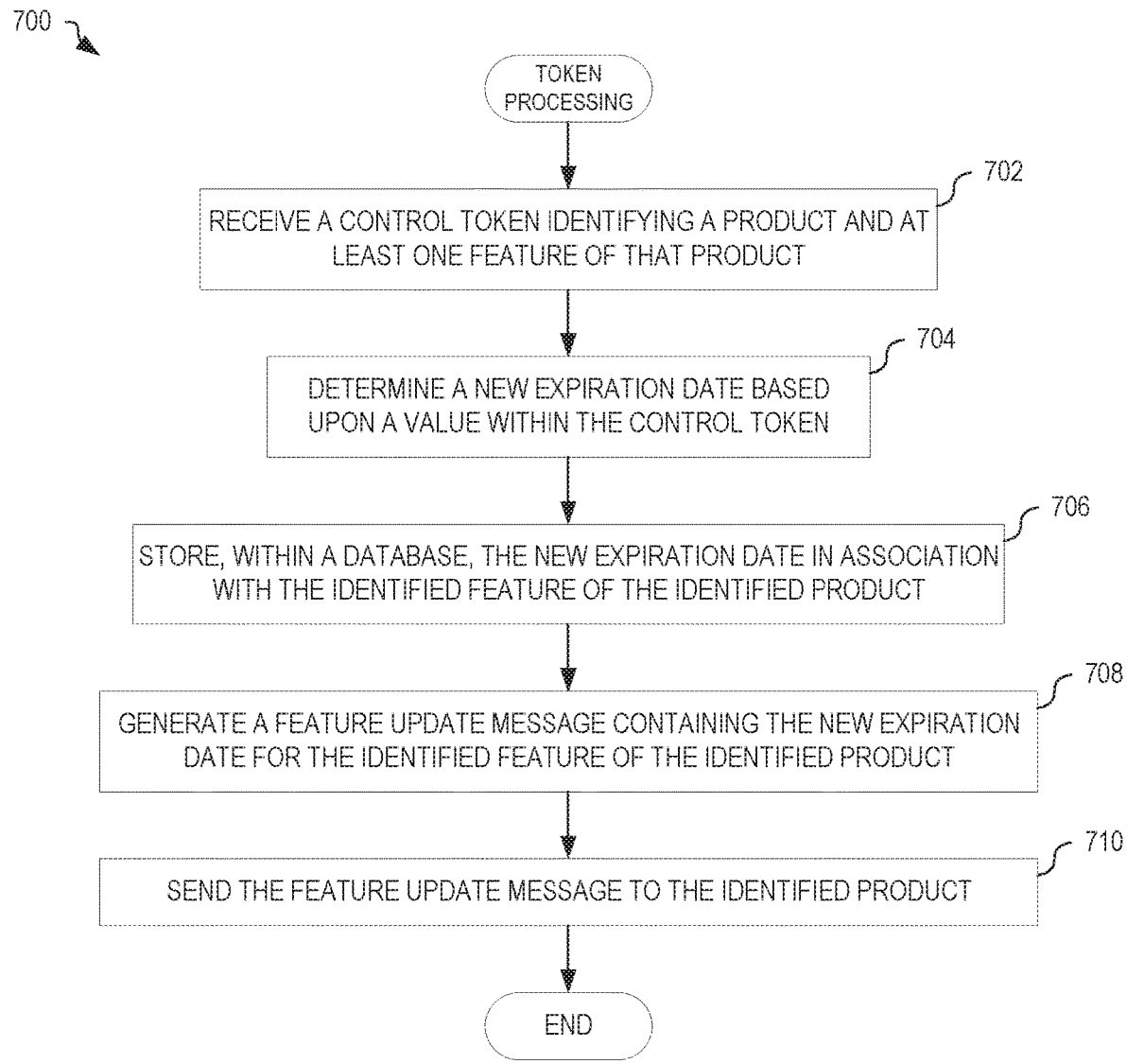
FIG. 7 shows one example method for time based remote control of product functionality based upon control tokens received by a server, in an embodiment.

FIG. 7 shows one example method for time based remote control of product functionality based upon control tokens received by a server. Method 700 is for example implemented within token handler 156 of server 150.

In step 702, method 700 receives a control token identifying a product and at least one feature of that product. In one example of step 702, token handler 180 within server 150 receives control token 180 from an accounting server. In step 704, method 700 determines a new expiration date based upon a value within the control token. In one example of step 704, token handler 156 determines a new expiration date based upon value 186 of control token 180, where value 186 defines the new expiration date. In step 706, method 700 stores, within a database, the new expiration date is association with the identified feature of the identified product. In one example of step 706, token handler 156 stores the new expiration date from control token 180 within expiration date 166(2) of product record 161 within feature database 160.

In step 708, method 700 generates a feature update message containing the new expiration date for the identified feature of the identified product. In one example of step 708, product controller 152 invokes configuration encoder 154 to generate feature update message 155 to include expiration date 166(2), corresponding to feature 110(2) of product 102, from product record 161 of feature database 160. In step 710, method 700 sends the feature update message to the identified product. In one example of step 710, product controller 152 sends feature update message 155 to product 102 via mobile device 140.

Payment

Figure 8:
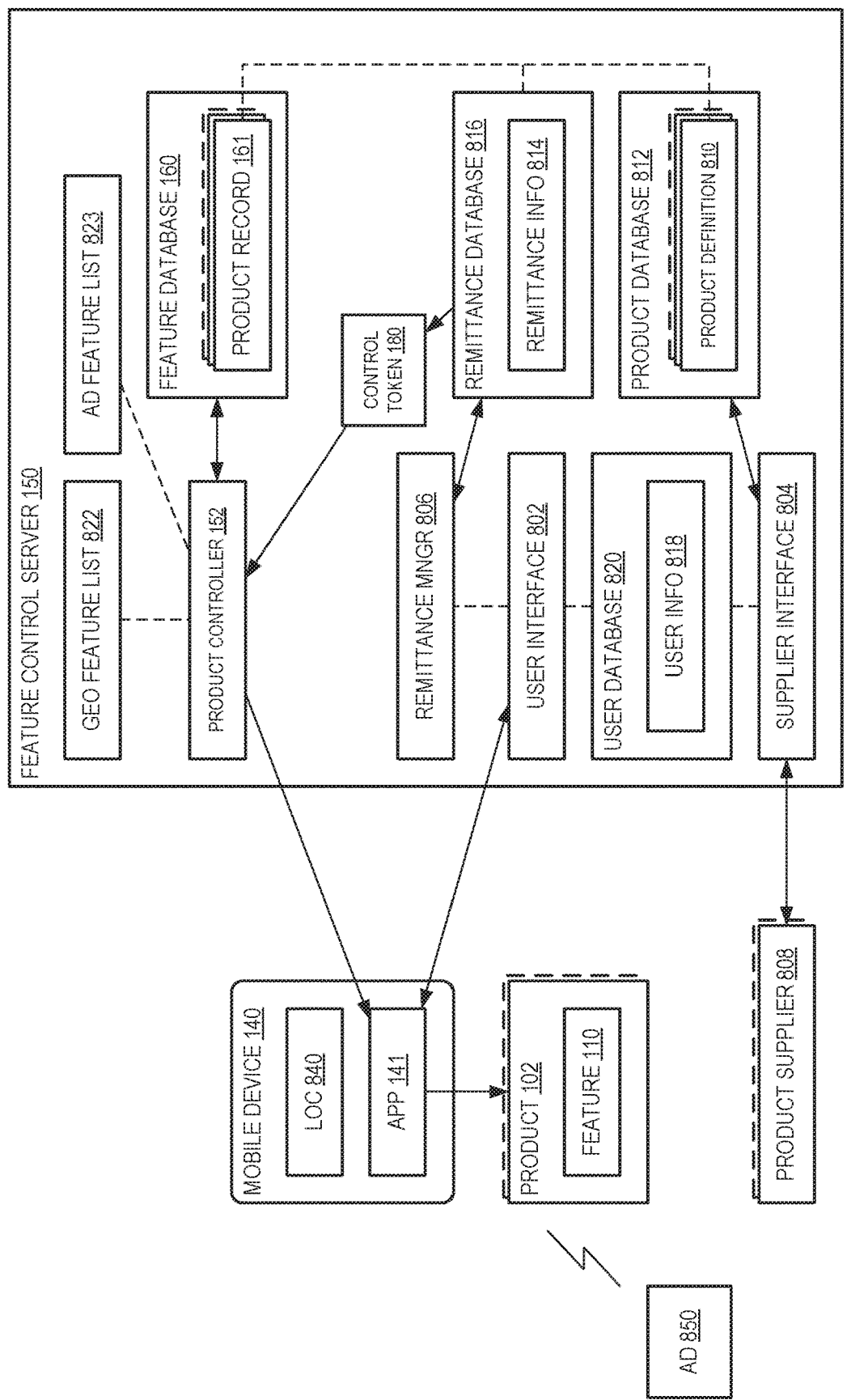
FIG. 8 is a functional block diagram showing the feature control server of FIG. 1 in further example detail.

FIG. 8 is a functional block diagram showing feature control server 150 of FIG. 1 in further example detail. Feature control server 150 is shown with a user interface 802, a supplier interface 804, and a remittance manager 806. Supplier interface 804 allows one or more product suppliers 808 to provide product definitions 810 that describe controllable features of each product they supply. For example, product supplier 808 is one of a manufacturer of product 102, a retailer of product 102, and a supplier of product 102, wherein product definition 810 defines features 110 and optionally updates rules 168 associated with each product 102. Product supplier 808 may, through interaction with supplier interface 804, generate a product definition 810 for each different product 102 that they supply. In certain embodiment, product definition 810 defines which of features 110 are enabled and disabled when product 102 is first purchased. For example, certain features 110 may be enabled for an initial period (e.g., one month, one year) from a purchase date of product 102, to be disabled once the initial period has expired.

In one embodiment, user interface 802 implements a web site that allows a user of product 102 to interactively control (enable and disable) features of product 102. In another embodiment, user interface 802 is a network interface that interacts with app 141, where app 141 interacts with the user of product 102 to control (enabling and disabling) of features of product 102. For example, the user may set one or more preferences within app 141 that automatically configure, through operation of feature control server 150, one or more features 110 of product 102.

In one embodiment, product supplier 808 may enter, via supplier interface 804, user information 818 into a user database 820, wherein user interface 802 may identify and authenticate the user of mobile device 140 against user information 818. In one embodiment, the user of mobile device 140 and product 102 may register product 102 through interaction with app 141 and/or user interface 802 to create user information 818.

User interface 802 may interact with remittance manager 806 to receive or confirm that remittance information 814 associated with one or more features 110 has been made. Remittance manager 806 may store remittance information 814 within a remittance database 816. In certain embodiments, remittance manager 806 may receive remittance from a user of product 102, store corresponding remittance information 814 within remittance database 816, and then forward the remittance to product supplier 808 associated with product 102. That is, feature control server 150 may process payments associated with enabling features 110. For example, remittance manager 806 may accumulate payments, within remittance database 816, and send the accumulated payments to the associated product suppliers 808 periodically (e.g., weekly, bi-monthly, monthly, and so on). That is, remittance manager 806 collects remittance corresponding to enabling features 110 of product 102 and provides at least a portion of that remittance to the corresponding product supplier 808 (or other entity collecting payment for feature upgrades to product 102). In one embodiment, remittance manager 806 interacts with a financial entity (e.g., a bank, a credit-card company, not shown) to facilitate management and transfer of received remittances. Remittance manager 806 may thereby provide support for business-to-business (B2B) and/or end-user based payments.

In one embodiment, remittance manager 806 received and/or confirms group payments where remittance is received to enable one or more features 110 on multiple products 102. For example, where a plurality of products 102 are used at a sporting competition, an organizer or sponsor of the competition may provide remittance to enable one or more features 110 on the plurality of products 102 for the duration of the competition, or longer. Accordingly, remittance manager 806 may generate control token 180 to identify more than one product 102 to which the feature changes apply.

Based upon corresponding remittance information 814, one or more features 110 within product 102 may be enabled, and/or user control of those features enabled. In certain embodiment, corresponding product definition 810 may define which features 110 may be enabled and/or controlled through confirmation of remittance information 814. For example, where product 102 has more than one level of monthly subscription, a value of remittance information 814 may defines which features 110 are enabled within product 102 associated with the user making the remittance. In one embodiment, user interface 802 also facilitates receipt of remittances through app 141, wherein a user of mobile device 140 may, through interaction with app 141, initiate transfer of a remittance to feature control server 150 or an associated financial entity. In certain embodiment, remittance manager 806 and user interface 802 cooperate to notify and/or automate receipt of periodic subscription payments. For example, where product 102 has an annual subscription payment, prior to expiration of a current subscription period, user interface 802 may interact with app 141 to remind the user of product 102 to make a payment or lose functionality In one embodiment, app 141 includes a list of features 110 of product 102 and enables the user, through use of mobile device 140, to select and deselect (e.g., using a check box or similar screen control) features of product 102 that are to be enabled or disabled. App 141 communicates the list of features to product controller 152, which automatically updates feature database 160 and generates and sends feature update message 155 to product 102 (e.g., via mobile device 140 and app 141). Where the user has not subscribed to certain features, app 141 may not allow the user to select these features without authorizing a corresponding remittance. Thus, app 141 may enable the user to subscribe to additional features on the fly.

In one embodiment, remittance information 814 is applied to the user and not specifically to an identified product. For example, where the user has multiple products 102 and provides remittance for one particular feature, feature control server 150 may allow the user to activate that feature on any one of the user's products 102 at a time. Thus, the user may "move" the feature to other products; first disabling the features on a first product, and then enabling the feature on a second product. Since feature control server 150 controls enabling and disabling of features on multiple products within feature database 160, feature control sever 150, and particularly product controller 152, ensures that the feature is only ever enabled on one product.

In certain embodiments, product controller 152 may interact with app 141 to determine available resources on product 102. For example, app 141 may interact with configuration manager 120 of product 102 to determine and/or verify feature availability of product 102. For example, where processor 104 is a Nordic Cortex M0 processor, configuration manager 120 may determine available resources (e.g., processing capability, memory availability, and so on) of product 102, and then automatically configure update, reset, and/or add new features 110 to product 102 based upon the determined resources. In another example, configuration manager 120 may determine connected circuitry within product 102, wherein product controller 152 may automatically configure features 110 of product 102 based upon the connected circuitry. In one embodiment, product controller 152 configures feature IDs 164 within product record 161 according to circuitry reported by configuration manager 120, thereby automatically determining and defining controllable functions 110 of product 102. For example, where product 102 forms a part of a performance tracking set of components, such as a bicycle computer, when one of the components is omitted from the set, product controller 152 may automatically disable one or more features 110 corresponding to the omitted product in one or more of the remaining products of the set. Such automatic control of features based upon determined resources may reduce battery consumption by "turning off" unneeded functionality In certain embodiments, upon detection of missing products in a set of products, product controller 152 may utilize user interface 802 to interact with the user via app 141. For example, where one product of the set is detected as missing, app 141 may be instructed to notify the user of the missing product, and/or interact with the user to control the associated function(s) 110 within the remaining products. In another example, a corresponding function in a product remaining within the set may be automatically enabled when a similar function was to be performed in a missing product. For example, where a battery fails on one product, certain functionality may be enabled in another product of the set such that the set continues to function.

In certain embodiments, product controller 152 determines a version number of embedded firmware 107 and compares that to a firmware version stored within product definition 810 to determine whether embedded firmware 107 is up to date within product 102. Where product controller 152 determines that a newer version of embedded firmware 107 is available, product controller 152 may interact with app 141 to determine whether the user of product 102 wishes to update embedded firmware 107. Where the user indicates that embedded firmware 107 may be updated, product controller 152 may send a newer version of embedded firmware 107 to product 102 (e.g., via mobile device 140 and app 141) for installation by configuration manager 120.

In certain embodiments, product controller 152 may enable and disable features 110 based upon a geographic location of product 102. For example, product controller 152 may interact with app 141 to determine a current geographic location of product 102. For example, assuming that product 102 is proximate mobile device 140 (i.e., when product 102 is in direct wireless communication range of mobile device 140), app 141 may utilize a locator 840 (e.g., GPS unit) of mobile device 140 to determine the geographic location of product 102. However, product controller 152 may use other devices that are near to product 102 to determine the geographic location without departing from the scope hereof.

Once the geographic location of product 102 is determined (or approximated), product controller 152 may evaluate the determined location against a geographic feature list 822 that contains a list of one or more geographic areas and corresponding feature identifiers. For example, an organizing entity may provide a remittance to use a particular feature 110 of product 102 at a venue (e.g., a competition), wherein geographic feature list 822 is updated with a geographic area corresponding to the venue and desired feature identifiers. Product controller 152 may then determine whether product 102 is within the defined geographic area, and if so, automatically enable the corresponding features of product 102. In another example, a certain feature 110 of product 102 is prohibited from use during a competition. An organizer of the competition defines a geographic area of the competition with the prohibited features. Where product controller 152 determines that product 102 is currently located within the geographic area, product controller 152 automatically disables the prohibited features on product 102.

In another embodiment, where product 102 may connect to one or more external services, product controller 152 may determine, using app 141 for example, whether product 102 is currently connected to that service, and automatically configure one or more features 110 of product 102 based upon that connection. In one embodiment, product 102 wirelessly connects to a nearby authentication device 850, and product controller 152, upon receiving a message from product 102 and/or mobile device 140 indicating that connection, automatically enables or disables one or more features 110 of product 102 based upon an authentication device feature list 823. For example, based upon an identifier of authentication device 850, product controller 152 may determine, from authentication device feature list 823 for example, one or more features 110 of product 102 that may be automatically controlled (e.g., enabled or disabled). Product controller 1522 may then send a message to product 102 indicating the control of the feature. In certain embodiment, the corresponding feature 110 may be enabled for a period specified within AD feature list 823. For example, by being proximate and in communication with authentication device 850, feature 110(3) may be automatically enable for a duration of an event, such as one hour, one day, and so on.

Geographic feature list 822 and/or authentication device feature list 823 may be updated in response to remittance received by remittance manager 806 from one or more entities, such as event organizers and/or sponsors.

In certain embodiments, through interaction with app 141 and configuration manager 120 of product 102, product controller 152 may determine and enable services.

As appreciated, feature database 160, product database 812, remittance database 816, and user database 820 may be combined as one or more databases within feature control server 150, and/or stored external to feature control server 150 without departing from the scope hereof.

In certain embodiments, functionality of feature control server 150 and of SDKs 402 and 452 may appear as if provided by a third party, such as product supplier 808. For example, through use of SDKs 402 and 452 and feature control server 150, each product supplier 808 may appear, to the user of mobile device 140 and product 102, as if they are specific to product supplier 808, even though feature control server 150 and associated functionality is simultaneously provided for many different products 102 having different product suppliers 808.

In some embodiments, certain functionality of product SDK 452 is included within, or associated with, processor 104. For example, functionality of product SDK 452 may be included with purchase of a Nordic Cortex M0 processor for use as processor 10 within product 102. Processor 104 may thereby represent a system-on-chip (SoC) that support a multiprotocol, ultra low power wireless connectivity including Bluetooth 5, IEEE 802.15.4, ANT+, and 2.4 GHz proprietary RF protocols. Thus product 102 may support timed small packet data send and receive services.

Feature control server 150 may be configured to also provide one or more of help desk support for processor 104 (e.g., for Nordic and Partner Developers), and back up support for end user support groups.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for remote time-based control of product functionality, comprising:
   wirelessly receiving, by a product and from a remote server via a mobile device in wireless communication with the remote server, an expiration date for a feature of the product;
   storing the expiration date in a memory of the product;
   controlling the feature based on the expiration date and a current date; and
   clearing the expiration date from the memory when the expiration date is prior to the current date.

2. The method of claim 1, further comprising maintaining a real-time clock within the product to provide the current date.

3. The method of claim 1, the step of controlling comprising operating the feature at a first level of functionality when the expiration date is clear and operating the feature at a second level, different from the first level, of functionality when the expiration date is not clear.

4. The method of claim 3, the feature being disabled for the first level of functionality.

5. The method of claim 3, the feature being enabled for the second level of functionality.

6. The method of claim 3, the second level of functionality being greater than the first level of functionality.

7. A product having time-based remote controlled functionality, comprising:
   a wireless transceiver for wirelessly communicating with a mobile device;
   a processor communicatively coupled with the wireless receiver; and
   a memory, communicatively coupled with the processor, storing machine-readable instructions that, when executed by the processor, control the product to:
   wirelessly receive, from a remote server via the mobile device, an expiration date for a feature of the product;
   store the expiration date in the memory;
   control the feature based on the expiration date and a current date; and
   clear the expiration date from the memory when the expiration date is prior to the current date.

8. The product of claim 7, the memory storing additional machine-readable instructions that, when executed by the processor, control the product to maintain a real-time clock within the product to provide the current date.

9. The product of claim 7, wherein the machine-readable instructions that control the product to control the feature comprise machine-readable instructions that, when executed by the processor, control the product to:
   operate the feature at a first level of functionality when the expiration date is clear; and
   operate the feature at a second level, different from the first level, of functionality when the expiration date is not clear.

10. The product of claim 9, the feature being disabled for the first level of functionality.

11. The product of claim 9, the feature being enabled for the second level of functionality.

12. The product of claim 9, the second level of functionality being greater than the first level of functionality.

* * * * *